United States Patent [19]
Ricken

[11] Patent Number: 5,645,106
[45] Date of Patent: Jul. 8, 1997

[54] PLUG-TYPE COUPLER

[75] Inventor: Norbert Ricken, Bochum, Germany

[73] Assignee: Carl Kurt Walther GmbH & Co. KG, Wuppertal, Germany

[21] Appl. No.: 444,702

[22] Filed: May 19, 1995

[30] Foreign Application Priority Data

Jun. 6, 1994 [DE] Germany .................. 44 19 77.2

[51] Int. Cl.$^6$ .................................................. F16L 37/28
[52] U.S. Cl. .................. 137/614.04; 137/614; 285/108; 285/917
[58] Field of Search .................. 137/614.04, 614.03, 137/614.02, 614.05, 614; 285/917, 108, 110, 111

[56] References Cited

U.S. PATENT DOCUMENTS

| | | | |
|---|---|---|---|
| 3,458,219 | 7/1969 | Wesch | 285/110 |
| 4,637,470 | 1/1987 | Weathers . | |
| 4,854,615 | 8/1989 | Smith, III . | |
| 5,063,965 | 11/1991 | Wilcox | 137/614.04 X |

FOREIGN PATENT DOCUMENTS

| | | |
|---|---|---|
| 1244756 | 11/1988 | Canada . |
| 925352 | 5/1963 | United Kingdom . |
| 2183310 | 6/1987 | United Kingdom . |
| 2230070 | 10/1990 | United Kingdom . |
| 9014547 | 11/1990 | WIPO . |

Primary Examiner—Kevin Lee
Attorney, Agent, or Firm—Martin A. Farber

[57] ABSTRACT

A plug-type coupler consisting of male part (P) and female part (M), particularly for the connecting of conduits (2, 3) conducting fluids (4), which coupling has, within the region of the abutment place (1) between male part (P) and female part (M), a metallic ring packing (D) which is expandable in its cross section as a result of its arrangement and of a surface slot (18) by fluid (4) which is under pressure and, in this connection, rests in part on the male part (P) and in part on the female part (M), and, in order to obtain a solution which is simple in manufacture and reliable in use, the ring packing (D) which is arranged on the male part (P), with its slot (17) facing radially inward is gripped over, on the other side of the slot edge lying in the insertion direction (arrow x) by an annular shoulder (24) from which there extends a frustoconical surface (25) which tapers down towards the axis (y—y) of the plug-type coupler and opposite which there is a mating surface (27) of the female part (M) which extends into an abutment surface (14) which urges the ring packing (D) in insertion direction (x), the frustoconical surface (25) and the mating surface (27) permitting the passage of fluid up to the ring packing (D).

7 Claims, 2 Drawing Sheets

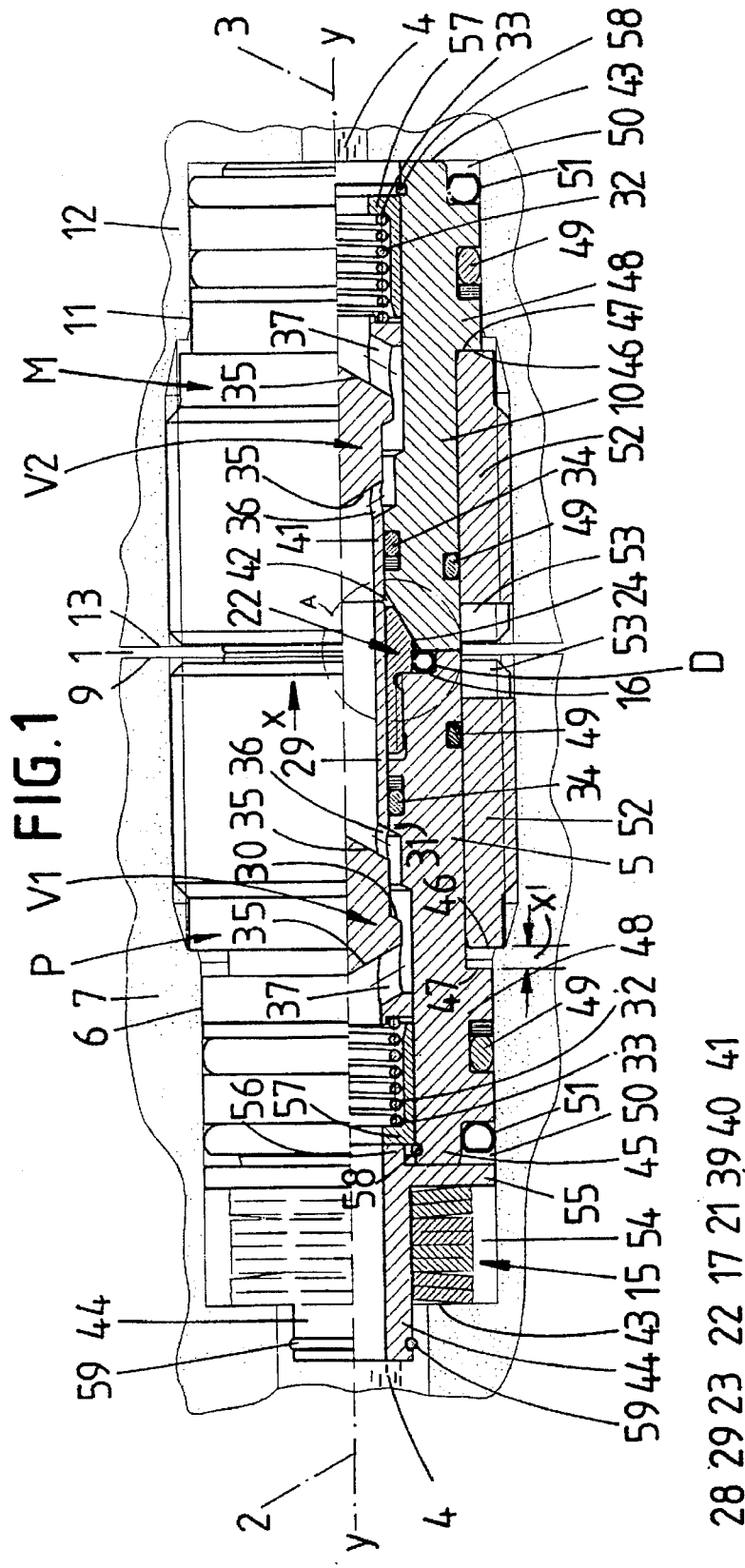
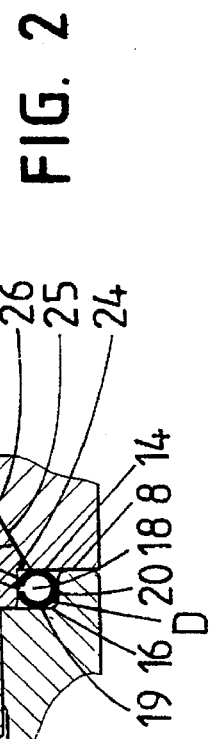

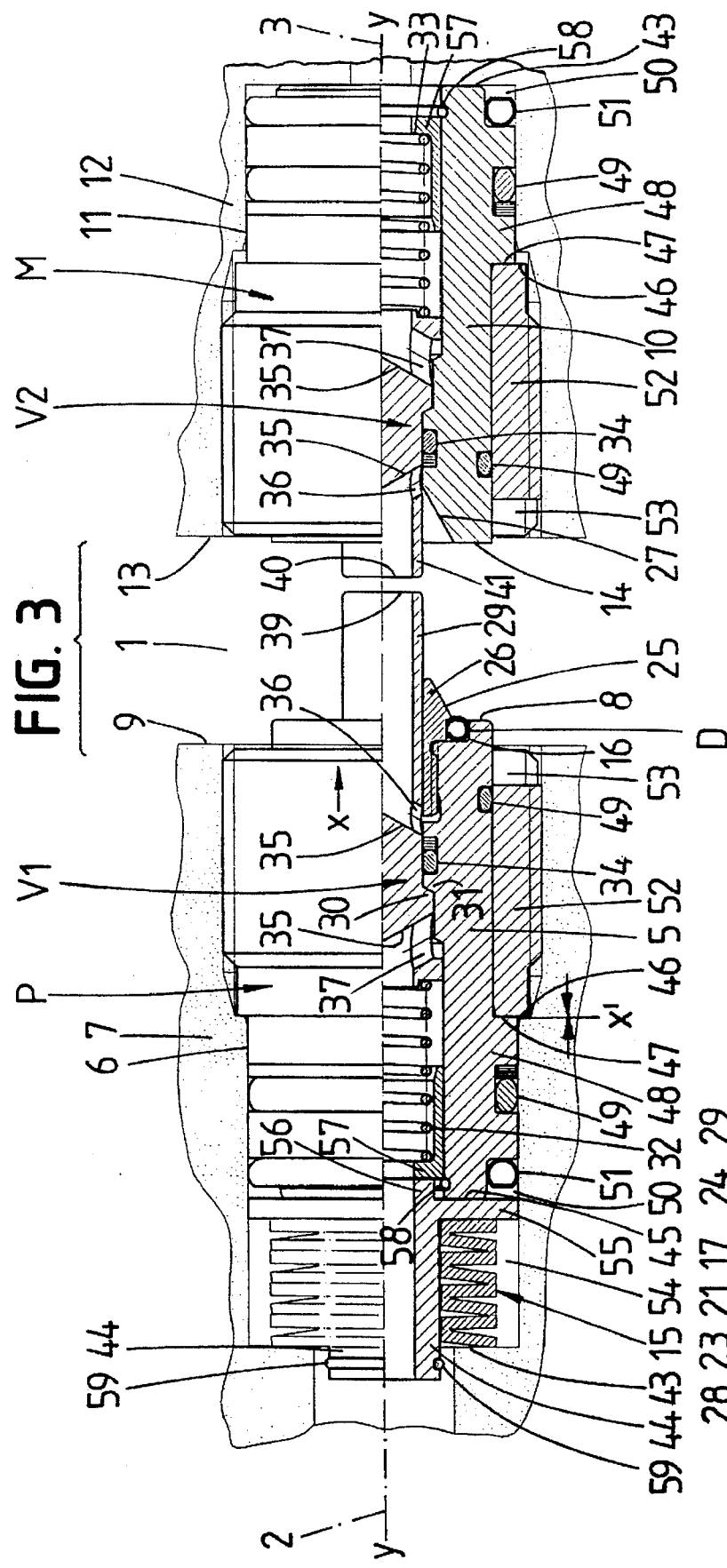

PLUG-TYPE COUPLER

FIELD AND BACKGROUND OF THE INVENTION

The present invention relates to a plug-type coupler consisting of a male part and a female part, particularly for connecting of fluid-connecting conduits, the coupler having a metallic ring packing in the region of the place of abutment between male part and female part, said packing being expandable in cross section, as a result of its arrangement and of a surface slot, by fluid under pressure and resting in this connection in part against the male part and in part against the female part.

From U.S. Pat. No. 4,854,615, it is known in a plug-type coupler to direct the slot of the ring packing directly into the insertion joint. The ring packing rests in a recess in the end side so that in the coupled condition of the coupler it rests in part against the male part and in part against the female part. In this connection, the pressure of the fluid promotes the sealing application of the metallic ring packing against the corresponding portions. No special securing of the ring packing is present.

From Canadian patent document 1 244 756, it is known to associate the male part with the receiving pocket of a support plate under initial axial stress.

SUMMARY OF THE INVENTION

The object of the present invention is to develop a plug-type coupler in a manner which is easy to manufacture and dependable in use.

As a result of the development of the invention, a plug-type coupler of increased usefulness and safety is created. This is obtained, in particular, by measures for the securing of the ring packing. Specifically, in this connection, the ring packing which is arranged with its slot facing inwardly on the male part is gripped over on the other side of the edge of the slot lying in the coupling direction by an annular shoulder from which a frustoconical surface which tapers towards the insertion coupling axis extends, said surface lying opposite a mating surface of the female part which extends into an abutment surface which urges the ring packing in the direction of insertion, the frustoconical surface and the mating surface permitting the flow of fluid up to the ring packing. The ring packing is thereby imparted a hold which withstands even greater mechanical stresses. Furthermore, direction action, that is action extending from the insertion joint, by the expanding fluid is avoided. Residual pressures passing directly onto the slot can no longer force the ring packing out. The gripping annular shoulder acts to block this. The exposed frustoconical surface — it can even be made very short — serves for the last, fine centering of the coupling halves, i.e. of the female part on the male part. The mating surface is adapted to the frustoconical surface and extends into the abutment surface which forms the place of abutment. It acts primarily against the corresponding end surface of the male part, so that the passage of fluid is assured by widening of the ring packing. In this connection, in addition to this, there is the contacting of the ring packing on the exposed edge thereof. The slot is so selected that, when the abutment surface of the male part is snugly seated, the slot is still open. It is furthermore proposed that the frustoconical surface be the end surface of a bushing inserted into a housing of the male part, the outer surface of the bushing extending in front of the slot, and that a rearward section of the bushing be in form-locked engagement with the housing of the male part. The outer surface of the bushing, which extends in front of the slot, has the function practically of a shield, and therefore a protective function. The slot edges cannot scrape on parts of the coupling half in question which otherwise form the mating surface. It is furthermore favorable in this connection for the inner surface of the bushing to sit on a central flow tube of the plug-type coupler, which is developed as closure coupler, and for the end surface of said tube to act in closure-valve controlling manner on the end surface of a mating pipe of the female part from the surface of which the mating surface extends at an acute angle on the other side of a packing ring. Said tubes are the stems of closure members which are spring-loaded in the direction of closing. The end surfaces which come against each other effect the controlling thereof upon the coupling process. The invention furthermore proposes that the male part be prestressed in the direction of insertion. The exposed position of the male part resulting from this has the result that tightness is present even in pressure-free condition. For the corresponding initial stressing a few millimeters are sufficient, for instance two millimeters. Specifically, the construction is such that the prestressing is formed by a set of springs which abuts at the one end on a shoulder of a guide housing of the male part and acts on the other end against an intermediate sleeve of the male part, which rests in uncoupled condition against a stationary stop. In this connection, furthermore, the unit consisting of the intermediate-sleeve and the male part which are clamped together by the set of springs leads to compensation for an excess path of the abutment surface beyond the packing of the ring packing. Upon the opening of the plug-type coupler, the abutment place of the coupling halves still remains together over the length of the stroke resulting from the initial stressing. In corresponding manner, the abutment surface still acts in sealing fashion on the ring packing. Finally, it has also been found advantageous for the stop to be formed by an end of a threaded ring. The latter has the advantage, at the same time, of a continuous displacement of the stop, and therefore the function of a fine adjustment.

The set of springs lies in the stream of fluid.

BRIEF DESCRIPTION OF THE DRAWINGS

With the above and other objects and other advantages in view, the present invention will become more clearly understood in connection with the detailed description of a preferred embodiment, when considered with the accompanying drawings of which:

FIG. 1 shows the plug-type coupler of the invention in coupled condition, seen in a half section;

FIG. 2 is an enlarged view of the region of the coupling designated A;

FIG. 3 shows the coupler as a half section in uncoupled condition; and

FIG. 4 is a showing corresponding to the enlargement of FIG. 2 with the ring packing present in its basic cross-sectional position.

DETAILED DESCRIPTION OF THE PREFERRED EMBODIMENT

The plug-type coupler which can be developed both as a passage coupler and — as shown in the drawing — as a closure coupler comprises a male part P and a female part M.

The ends of the two parts facing away from an approximately central abutment place 1 of the plug-type coupler pass into conduits 2 and 3 respectively. These conduits conduct the fluid 4 which flows through the plug-type coupler. The fluid 4 can/should be under pressure.

Each of the two coupler halves, and therefore the male part P and the female part M, has a support associated with it. These supports can be moved, by external control and linearly guided, towards and away from each other. Such supports can have several male parts and female parts, in the manner of a so-called multi-coupler.

The male part P has an elongated housing 5 of rotational symmetry. It is mounted in the hollow 6 of a guide housing 7. The latter can already be identical to the abovementioned support.

Both in coupled position and in uncoupled position, the outer flat section of an end surface 8 of the male-part housing 5 protrudes over the outer surface 9 of the guide housing 7, which surface is flat in the same manner, in the direction of the abutment place 1. In uncoupled condition, the corresponding protrusion is greater, as a result of axial displaceability of the male part P.

In the same manner, the female part M has a housing 10. The latter, however, is contained in axially non-displaceable manner within a cavity 11 of a receiving part 12, which in this case also can be identical to the aforementioned support.

The female-part housing 10 is of rotational symmetry and its end surface protrudes beyond the outer surface 13 on the abutment side there. This end surface acts as abutment surface 14 for the operational inwardly-directed axial displacement of the male-part housing 5. The latter is urged in the direction of insertion x of the male part P. For this, a set of springs 15 is arranged at the rear of the male part P.

The inner section of the end surface 8 has a stepped recess 16. The latter is open in the direction of insertion x and radially inwardly directed. Said recess 16 receives a metallic ring packing D in the region of the abutment place 1 between male part P and female part M. A annular shape is present both in its course of rotational symmetry and in cross section. The cross section has substantially the shape of a circular ring. The ring is open. In the central plane or diametric plane it has a slot 17. Said slot passes through the entire wall thickness of the cross section of the ring and thus adjoins the tubular-shaped space 18 of the ring packing D. The ring packing D can therefore be widened by fluid 4 which is under pressure so that the surface sections close to the slot lie, in coupling position with the passage of fluid, firmly on the one side against said abutment surface 14 and on the other side against that surface 19 of the outer recess 16 which forms a step.

The convex apex of the ring packing D which lies diametrically opposite the slot 17 rests on the annular flank 20 there of the recess 16. The supporting which takes place in part on the male part P and in part on the female part M can be noted particularly clearly from the enlarged view A, namely FIG. 2.

The sections of the surface which are close to the slot are themselves not associated with an axially displaceable section of the coupling halves, but with a stationary section. This stationary section is an outer surface 21 of a bushing 22. A rear section 23 of the latter is in form-locked engagement with the male-part housing 5. There is a threaded attachment with stop limitation on the inner section of the surface 19 of the recess 16.

The bushing 22 at the same time forms the locking member for the ring packing D. An annular shoulder 24 of a head end of correspondingly enlarged cross section of the bushing 22 extends namely in part over it on the other side of the edge of the slot lying in the insertion direction x. The annular shoulder 24 which extends axially outward beyond the outer surface 21 narrows the region between the latter and the end surface 8 to below the dimension of the annular body of the ring packing D which is moved back under spring action into the basic position.

The annular shoulder 24 extends at an angle of about 45° to the axis of the coupler, namely the longitudinal center line y—y of the coupler.

A frustoconical surface 25 extends from the peripheral ring edge of the annular shoulder 24. This surface forms an angle of about 30° with said longitudinal center line y—y. A male-part head 26 which exerts a centering action is thus produced. Its frustoconical surface cooperates with a corresponding mating surface 27 of the female part M which extends into the flat abutment surface 14 which urges the ring packing D in the direction opposite the direction of insertion x. The dimensions in this connection are such that the abutment surface 14 comes predominantly against the corresponding end surface 8 of the male part P so that the frustoconical surface 25 and the mating surface 27 of adapted contour permit the passage of the fluid up to the ring packing D. A fine, funnel-shaped annular slot remains between the said two surfaces, so that the fluid 4 which is under pressure, traveling around the surface section of the free half of the ring, passes with a component in widening manner into the space 18.

Frustoconical surface 25 and end surface 8 form an obtuse angle α. The wall section of the ring packing lying in the direction of insertion places itself into this angular space due to its restoring force and a certain initial stress (see FIG. 4).

The protrusion z defined by the annular shoulder 24 (FIG. 4) amounts to a few millimeters. Upon contact with the abutment surface 14 and the pressing-in of the corresponding section of the ring packing D the sealing already commences. The slot 17, as indicated above, is so dimensioned that it is not closed when the abutment surface 14 strikes the end surface 8; see FIG. 2.

The bushing 22 has a central cylindrical hollow. A central flow tube 29 of the coupling is guided on the inner surface 28 which is formed in this manner. The flow tube 29 is the stem of a valve body of a closure valve V1 which is displaceable against spring load. A collar 30 developed on the valve body cooperates with a stop shoulder 31 on the male-part housing 5. The compression spring acting on the valve body is 32. It extends in the rear of the valve body and rests, fixed on the housing, against an abutment surface 33.

The valve body of the closure valve V1 cooperates on the wall side with a packing ring 34 of the male-part housing 5.

Flow openings 36 are provided between a conical surface 35 of the valve body which tapers in the direction of insertion x and the packing plane of the flow tube 29 which is defined by the packing ring 34. Similar openings 37 lie in the back of the valve body, which passes there also into a conical surface 35 which tapers in opposite direction to x. In this way, in the coupled position shown in FIG. 1, the valve body of the closure valve V1 which otherwise exerts a closing action can be flown around peripherally.

The corresponding position of release of this closure valve V1 results during the course of the coupling of the two coupling halves, since the flow tube 29 protrudes or is free in the direction of insertion. By its free-standing end or, more precisely, by its external end surface 39, it forms a control member. The control surface 39 of the flow tube 29 cooperates with an end surface 40 of a mating tube 41 of the female part M. The mating tube 41 is also part of a valve body present there, which forms a closure valve V2. Except for a shorter length of tube, the latter is developed in the same manner as the closure valve V1 of the female part P. The reference numbers have therefore been applied accordingly; repetition in the text has been dispensed with.

In coupled position (FIG. 1), the valve bodies are lifted from their valve-seat surfaces by the controlling end surfaces 39 and 40 striking against each other. The flow path is in this way released. The end-surface joint extends in the plane of a valve annular slot 42 which surrounds it. This slot is formed by the truncating of the male head 26. Its end lies set back with respect to the end surface 39 (see FIG. 3), while the mating surface bridges over the region of the distributor annular slot 42 and extends into the surface of the mating tube 41. Thus, the component of the fluid 4 which is under pressure and which expands the ring packing can act on the ring packing D to effect said widening. The outer edges of the tube sections forming the end surfaces 39 and 40 are beveled or convexly rounded. In order to increase the flow effect in the region of the annular slot 42, the end surfaces can possibly be grooved radially.

A second component inflow results over the outside of the bushing 22 utilizing the thread path, with, of course, corresponding permeability of the recess surface 19. During the course of the production of the coupled position, the male part P is displaced from a spring-actuated forward position opposite the direction of insertion x by the female part M which itself is non-displaceable.

The set of springs 15 which produces the corresponding initial stressing finds its abutment on a shoulder 43 of the guide housing 7. At the other end, the prestressed set of springs 15 acts against an intermediate sleeve 44 which, seen in the direction of the line 2, coaxially adjoins the male-part housing 5. This intermediate sleeve 44 rests against the end 45 there of the male part P.

The male-part housing 5 is limited in its spring-loaded forward position by a stop 46 against which the corresponding annular surface 47 of a collar 48 of larger diameter of the male-part housing 5 comes. The collar 48 receives, in a peripheral groove, a packing ring 49 which cooperates, as mating surface, with the inner wall of the cavity 6 of the guide housing 7. In a rearward recess 50 in the housing 5 there is a metal packing 51, which can also be expanded by fluid pressure.

The stop 46 is the end facing opposite the insertion direction x, of a screw ring 52 which finds a corresponding inner thread for its outer thread in the entrance region of the cavity 6. The stop 26 can be finely adjusted by turning to a greater or lesser depth. In the region of the other, outward-directed end, there are gripping recesses 53 for a tool. The cylindrical inner surface of the screw ring 52 continues the guiding action of the cavity 6.

The spring chamber 54 which receives the set of springs 15 finds its closure in the direction of insertion x by an annular wall 55. The latter is seated in one piece on the surface of the intermediate sleeve 44 and covers the recess 50, closing it with radial play.

As can be noted from the diagrammatic showing, the intermediate sleeve 44 is continued beyond the end 45 of the housing 5. This overlapping extension 56 extends up into a supporting sleeve 57 which receives the spring 32 and forms the bearing surface 33. The supporting sleeve has an L-shaped profile and is supported against emergence by a holding ring 58. The latter has a flow-free bridging by the extension 56.

A second holding ring 59 on the outwardly-directed end of the intermediate sleeve 44 avoids the sliding of the set of springs, consisting of individual plates, which is threaded thereon.

With respect to the female part M, the same development is present with respect to the supporting sleeve, and therefore of the housing 10, etc. The reference numerals have been applied accordingly. The same applies also with respect to the arrangement of a screw ring 52 for holding the female-part housing 10. Here, however, the distance between the stop 46 and the annular surface 47 which produces a free path x' on the male part P is not present. Rather, the collar 48 of the similarly shaped female-part housing 10 is held in non-displaceable manner. Said collar 48 is held clamped between the stop 46 and the shoulder 43. The packing means are here of the same type. In the abutment region of the coupling halves, there are further packing rings 49 between the inside of the screw ring 52 and the wall of the housings 5 and 50.

The operation, briefly summarized, is as follows: With directed approach towards each other of the supports of male part P and female part M, the exposed parts of coupling halves come into contact. This leads to an opening of the closure valves V1 and V2, together with the introduction of the male-part head 26 into the corresponding funnel-shaped female part cavity, formed by the mating surface 27. The abutment surface 14 comes to rest in a manner which already effects a seal against the exposed zone of the ring packing D, which is acted on in opposition to its restoring force. Finally, the abutment surface 14 comes against the end surface 8 of the male part P. The movement continues against the force of the force accumulator described, namely the prestressed set of springs 15. The unit 44/P consisting of the intermediate sleeve and the male part, which is clamped together by the set of springs 15, leads to compensation for an excess path of the abutment surface 14 beyond the packing of the ring packing Do The forward movement resulting from the prestressing and the corresponding free path x' has the result that the closure coupler is tight also in pressure-less state. It can therefore be used as pressure-less return-flow line.

I claim:

1. A plug-type coupler comprising:
    a male part and a female part, the coupler being suitable for a connecting of fluid conducting conduits, there being an abutment place between the male part and the female part;
    a metallic ring packing disposed on said male part in a region of the abutment place, said ring packing having a circumferential slot facing radially inward and being located in a transverse plane of the coupler, said slot enabling expansion of said ring packing in its cross section in a presence of pressure of a fluid within the coupling, said ring packing resting partly on said male part and partly on said female part upon connection of said male part to said female part;
    an annular shoulder disposed on said male part, there being a frustoconical surface which extends from said shoulder and tapers towards an axis of said male part, wherein said slot has a forward side and a back side opposite said forward side, said forward side lies between said back side and an insertion end of said male part, and said ring packing is gripped over by said annular shoulder on said forward side of said slot;
    an abutment surface of said female part, and a mating surface of said female part lying opposite said frustoconical surface and extending into said abutment surface, said abutment surface urging said ring packing toward said male part upon connection of said male part to said female part; and
    wherein said frustoconical surface and said mating surface permit a passage of fluid up to said ring packing.

2. A plug-type coupler according to claim 1, wherein said male part comprises a housing and a bushing enclosed by the housing, said bushing having said frustoconical surface disposed on an end surface of the bushing;

an outer surface of said bushing extends in front of said slot; and a rear section of said bushing is in form-locked engagement with said housing of said male part.

3. A plug-type coupler according to claim 2, wherein said male part comprises a central flow tube and said female part comprises a mating tube for said flow tube, the coupler being a closure coupler;

an inner surface of said bushing is seated on the central flow tube, an end surface of the flow tube acts on an end surface of the mating tube in a closure-valve controlling manner; and said mating surface of said female part abuts said frustoconical surface along an interface inclined at an acute angle to an axis of the coupler away from said packing ring upon connection of said male part to said female part.

4. A plug-type coupler according to claim 1, wherein said male part is subject to a prestressing in a direction of insertion of said male part toward said female part.

5. A plug-type coupler according to claim 4, further comprising a set of springs located in said male part;

wherein said prestressing is accomplished by said set of springs;

said male part further comprises a guide housing encircling said set of springs, said guide housing having a shoulder upon which abuts a first end of said set of springs;

an intermediate sleeve coaxial to said set of springs and being configured to abut a second end of said spring set opposite said first end of said spring set; and a fixed stop, said intermediate sleeve being slidable under force of said spring set to rest against said fixed stop in an uncoupled position of said coupler.

6. A plug-type coupler according to claim 5 wherein, in a coupled state of said coupler, said intermediate sleeve is urged by said spring set against a counter force of said female part to effect a clamping together by said set of springs; and wherein said spring set leads to a compensation of spacing for an excess path of an abutment surface of said intermediate sleeve, at said second end of said spring set, beyond a stroke path for a sealing of said ring packing.

7. A plug-type coupler according to claim 6, wherein said male part further comprises a screw ring at an end region of said male part adjacent said packing; and said fixed stop is located on an end of said screw ring.

* * * * *